US008680795B2

United States Patent
Tang et al.

(10) Patent No.: US 8,680,795 B2
(45) Date of Patent: Mar. 25, 2014

(54) VEHICLE ELECTRIC DRIVE AND POWER SYSTEMS

(75) Inventors: Yuqing Tang, Northville, MI (US); Hongjie Wu, Canton, MI (US); William Paul Perkins, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 341 days.

(21) Appl. No.: 13/152,325

(22) Filed: Jun. 3, 2011

(65) Prior Publication Data
US 2012/0306412 A1 Dec. 6, 2012

(51) Int. Cl.
*H02P 1/00* (2006.01)
(52) U.S. Cl.
USPC .......................................... 318/139; 318/798
(58) Field of Classification Search
USPC .................. 318/139, 798, 800, 801
See application file for complete search history.

(56) References Cited

U.S. PATENT DOCUMENTS

| 5,949,658 | A | 9/1999 | Thottuvelil et al. |
| 6,172,882 | B1 | 1/2001 | Tanaka et al. |
| 7,791,915 | B2 * | 9/2010 | Chatroux et al. .............. 363/132 |
| 2003/0012038 | A1 * | 1/2003 | Welches et al. .................. 363/34 |
| 2004/0100149 | A1 * | 5/2004 | Lai ................................. 307/82 |
| 2005/0029872 | A1 | 2/2005 | Ehrman et al. |
| 2007/0025125 | A1 * | 2/2007 | Nakahori et al. .......... 363/56.02 |
| 2010/0097031 | A1 * | 4/2010 | King et al. .................... 320/109 |
| 2010/0123441 | A1 * | 5/2010 | Kim et al. ..................... 323/272 |

OTHER PUBLICATIONS

LM5032 Interleaved Boost Converter, wwwd.national.com, printed on May 31, 2011, 12 pages.

* cited by examiner

*Primary Examiner* — Rina Duda
(74) *Attorney, Agent, or Firm* — David B. Kelley; Brooks Kushman P.C.

(57) ABSTRACT

An automotive electric drive system may include an electric power source, an electric machine, and a DC-DC power converter electrically connected between the electric power source and the electric machine. The DC-DC power converter may include an inductor and a first switch each disposed in a different current path connecting the electric power source and the electric machine. The currents paths may be electrically in parallel.

12 Claims, 2 Drawing Sheets

VEHICLE ELECTRIC DRIVE AND POWER SYSTEMS

TECHNICAL FIELD

This disclosure relates to power converters for vehicles.

BACKGROUND

DC-DC converters may convert a source of direct current from one voltage level to another.

Certain DC-DC converters convert one DC voltage level to another by storing the input energy temporarily and then releasing that energy to the output at a different voltage. The storage may be in either magnetic field storage components (inductors, transformers) or electric field storage components (capacitors). By adjusting the duty cycle of the charging voltage (the ratio of on/off time), the amount of power transferred can be controlled. Such conversion may be more power efficient (often 75% to 98%) than linear voltage regulation (which dissipates unwanted power as heat). This level of efficiency may be beneficial to increasing the run time of battery operated devices.

The efficiency of some DC-DC converters has increased in recent decades due to the use of power field effect transistors, which are able to switch at high frequencies and more efficiently than power bipolar transistors, which may incur greater switching losses and require complicated drive circuits.

Battery (or other alternatively) powered automotive vehicles may include a converter arranged to increase a voltage output by a battery and/or decrease a voltage to be input to the battery.

SUMMARY

An automotive electric drive system may include an electric power source, an electric machine, and a DC-DC power converter. The DC-DC power converter may be electrically connected between the electric power source and the electric machine and include an inductor and a first switch each disposed in a different current path connecting the electric power source and the electric machine, wherein the currents paths are electrically in parallel.

The inductor and first switch may be electrically in parallel.

The DC-DC power converter may further include second and third switches and be configured to cause an input voltage to increase or decrease when the second and third switches are selectively turned on and off.

The first switch may include a terminal electrically connected between the inductor and the second switch.

The system may further include an inverter electrically connected between the DC-DC power converter and the electric machine.

The first switch may be an insulated gate bipolar transistor, a metal-oxide-semiconductor field-effect transistor, or a relay.

The DC-DC power converter may be a bidirectional DC-DC power converter.

An automotive power system may include a DC-DC power converter including first and second electrical current paths electrically in parallel, a first switch disposed in the first electrical current path, and an inductor disposed in the second electrical current path. The automotive power system may further include a controller configured to turn on the first switch when an input voltage and output voltage of the DC-DC power converter are caused to be approximately equal.

The controller may be further configured to turn off the first switch when an input voltage and output voltage of the DC-DC power converter are caused to be unequal.

The first switch and inductor may be electrically in parallel.

The DC-DC power converter may further include second and third switches. The controller may be further configured to selectively turn on and off the second and third switches to cause the DC-DC power converter to increase or decrease a voltage input to the DC-DC power converter.

The first switch may include a terminal electrically connected between the inductor and the second switch.

The system may further include an inverter electrically connected with the DC-DC power converter.

An automotive power system may include a DC-DC power converter. The DC-DC power converter may include first and second electrical current paths electrically in parallel, a first switch disposed in the first current path, an inductor disposed in the second current path, and second and third switches that, when selectively turned on and off, cause the DC-DC power converter to increase or decrease a voltage input to the DC-DC power converter.

The first switch and inductor may be electrically in parallel.

The first switch may include a terminal electrically connected between the inductor and the second switch.

The first switch may be an insulated gate bipolar transistor, a metal-oxide-semiconductor field-effect transistor, or a relay.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
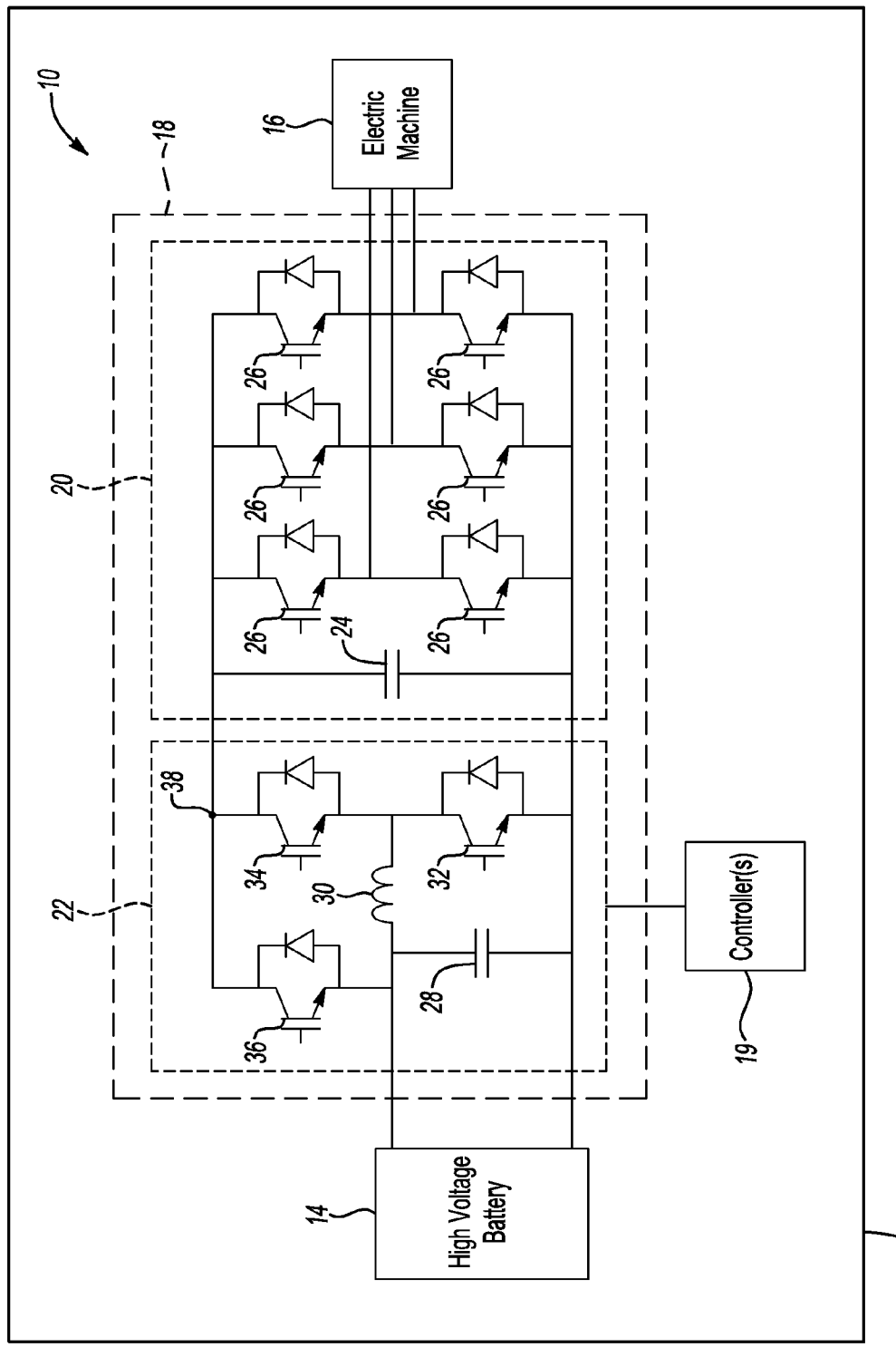
FIG. 1 is a block diagram of an automotive electric drive system.

Referring to FIG. 1, an electric drive system 10 for an automotive vehicle 12 (e.g., battery electric vehicle, hybrid electric vehicle, etc.) may include an electric power source 14 (e.g., traction battery, fuel cell, etc.), an electric machine 16 (which may be used to generate motive power for the vehicle 12), a power converter 18, and one or more controllers 19. The power converter 18 is configured, in this embodiment, to convert DC power output by the traction battery 14 to AC power for input to the electric machine 16, and vice versa. The power converter 18 is also configured to increase a voltage input by the traction battery 14 for output to the electric machine 16, and to decrease a voltage input by the electric machine 16 for output to the fraction battery 14.

The power converter 18 may include an inverter 20 and a DC/DC bidirectional buck/boost converter 22. Other power converter arrangements, however, are also possible. For example, power converters of certain embodiments may lack inverters; the DC/DC converters may be unidirectional, etc. The inverter 20 includes a capacitor 24 and a plurality of switches 26 as typical in the art. As such, DC power received from the DC/DC converter 22 may be transformed to AC power for delivery to the electric machine 16, and vice versa. The DC/DC converter 22 includes a capacitor 28, an inductor 30, and switches 32, 34, 36 (e.g., insulated gate bipolar transistors, metal-oxide-semiconductor field-effect transistors, relays, etc.) Provided that switch 36 is off, the switches 32, 34 may be selectively turned on and off as known in the art (under the command of the controllers 19) to cause either an increase in voltage input from the traction battery 14 for output to the inverter 20 or a decrease in voltage input from the inverter 20 for output to the traction battery 14.

The inductor 30 tends to resist changes in current (as it is an energy storage device). While being charged, the inductor 30 acts as a load and absorbs energy (somewhat like a resistor). While being discharged, the inductor 30 acts as an energy source (somewhat like a battery). (The boost voltage is controlled by controlling the ratio of charging and discharging the inductor 30. The voltage it produces during the discharge phase is related to the rate of change of current, and not to the original charging voltage, thus allowing different input and output voltages.) Hence, significant conduction loss may occur through the inductor 30 whenever current flows through it (affecting the electric drive system efficiency), which may impact the drive range and/or fuel economy of the vehicle 12. This significant conduction loss may be unavoidable in circumstances where the DC/DC converter 22 is being operated to increase or decrease an input voltage, which is only for limited times during most drive cycles. Often, the DC/DC converter 22 is merely acting as a current path between the traction battery 14 and inverter 20 (i.e., the input and output voltages of the DC/DC converter 22 are approximately equal). The selective activation of the switch 36 during such times may reduce the conduction loss through the DC/DC converter 22, and thus improve the drive range and/or fuel economy of the vehicle 12 as explained below.

To reduce current flow through the inductor 30 during periods of time when the DC/DC converter 22 is merely acting as a current path between the traction battery 14 and inverter 20, the controllers 19 may command the switches 34, 36 to close and may command the switch 32 to open. Current may thus flow in parallel paths (through the path including the inductor 30 and switch 34, and through the path including the switch 36) between the traction battery 14 and inverter 20 (and electric machine 16). In other embodiments, the controllers 19 may command the switch 36 to close and may command the switches 32, 34 to open. Current may thus bypass the inductor 30 all together if current is flowing from the inverter 20 to the fraction battery 14. (The switch 34, in the embodiment of FIG. 1, includes a diode configured to, when the switch 34 is open, block current flow from the inverter 20 to the traction battery 14 and permit current flow from traction battery 14 to the inverter 20.)

Bypassing the inductor 30 all together, as described above, may not minimize conduction losses associated with the DC/DC converter 22. Conduction losses, for example, may also be associated with each of the switches 32, 34, 36 (although they are substantially less than that of the inductor 30 for currents normally passed by the DC/DC converter 22). Moreover, the equivalent parallel resistance of the inductor 30 and switches 34, 36 is less than the resistance of the switch 36 by itself:

$$1/(1/R_{36}+1/(R_{30}+R_{34}))<R_{36}$$

where $R_{30}$ is the resistance associated with the inductor 30, $R_{34}$ is the equivalent resistance associated with the switch 34, and $R_{36}$ is the equivalent resistance associated with the switch 36. Hence, the sum of the conduction losses associated with the inductor 30 and switches 34, 36 if current flows through each may be less than the conduction loss associated with the switch 36 if all current flows through it. Put another way, providing parallel paths for current to flow between the traction battery 14 and inverter 20 may minimize the conduction loss through the DC/DC converter 22 compared with providing a single path for current to flow between the traction battery 14 and inverter 20.

Figure 2:
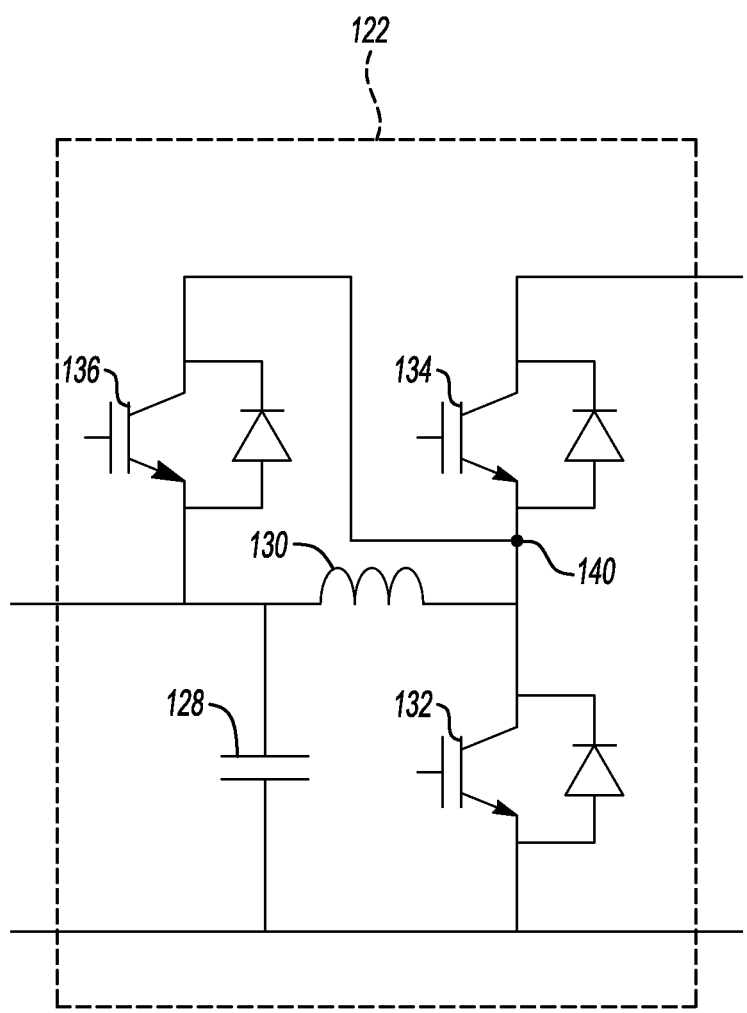
FIG. 2 is a block diagram of a DC-DC power converter.

The inverter 20 and switches 34, 36 share a common terminal 38. Thus, current that flows through the switch 36 does not flow through the switch 34. Referring to FIG. 2 where elements having like numerals share similar descriptions, the inductor 130 and switch 136 share a common terminal 140. (The inductor 130 and switch 136 are in parallel.) Current that flows through the switch 136 also flows through the switch 134. Thus, conduction losses associated with the DC/DC converter 122 may be greater than the conduction losses associated with the DC/DC converter 22 of FIG. 1. Other arrangements, however, are also possible.

Computer simulations of a hybrid electric vehicle operating a DC/DC power converter similar to that described with respect to FIG. 1 were run. An approximate 0.2% to 1% decrease in energy usage was observed relative to computer simulations of a hybrid electric vehicle operating a DC/DC power converter lacking the switch 36 (as is conventional in the art).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An automotive electric drive system comprising:
    an electric power source;
    an electric machine; and
    a DC-DC power converter (i) electrically connected between the electric power source and the electric machine and (ii) including an inductor and a first switch each disposed in a different parallel current path connecting the electric power source and the electric machine, and second and third switches, wherein the first switch includes a terminal electrically connected between the inductor and the second switch and wherein the DC-DC power converter is configured to cause an input voltage to increase or decrease when the second and third switches are selectively turned on and off.

2. The system of claim 1 wherein the inductor and first switch are electrically in parallel.

3. The system of claim 1 further comprising an inverter electrically connected between the DC-DC power converter and the electric machine.

4. The system of claim 1 wherein the first switch is an insulated gate bipolar transistor, a metal-oxide-semiconductor field-effect transistor, or a relay.

5. The system of claim 1 wherein the DC-DC power converter is a bidirectional DC-DC power converter.

6. An automotive power system comprising:
    a DC-DC power converter including first and second electrical current paths electrically in parallel, a first switch disposed in the first electrical current path, second and third switches, and an inductor disposed in the second electrical current path, wherein the first switch includes a terminal electrically connected between the second switch and the inductor; and a controller configured to (i) turn on the first switch when an input voltage and output voltage of the DC-DC power converter are caused to be approximately equal and (ii) selectively turn on and off the second and third switches to cause the DC-DC power converter to increase or decrease a voltage input to the DC-DC power converter.

7. The system of claim 6 wherein the controller is further configured to turn off the first switch when an input voltage and output voltage of the DC-DC power converter are caused to be unequal.

8. The system of claim 6 wherein the first switch and inductor are electrically in parallel.

9. The system of claim 6 further comprising an inverter electrically connected with the DC-DC power converter.

10. A power system comprising:
a DC-DC power converter including (i) first and second electrical current paths electrically in parallel, (ii) a first switch disposed in the first current path, (iii) an inductor disposed in the second current path, and (iv) second and third switches that, when selectively turned on and off, cause the converter to increase or decrease a voltage input to the converter, wherein the first switch includes a terminal connected between the inductor and second switch.

11. The system of claim 10 wherein the first switch and inductor are electrically in parallel.

12. The converter of claim 10 wherein the first switch is an insulated gate bipolar transistor, a metal-oxide-semiconductor field-effect transistor, or a relay.

\* \* \* \* \*